United States Patent
Wulf et al.

(10) Patent No.: US 8,968,480 B1
(45) Date of Patent: Mar. 3, 2015

(54) METHOD OF SEQUESTERING HYDROCARBONS OR VEGETABLE DERIVED OIL CONTAMINANTS FROM A SURFACE

(71) Applicant: Oil Spill Solutions, LLC, Center, TX (US)

(72) Inventors: Fred Wulf, Center, TX (US); Phillip D. Calvert, Waco, TX (US)

(73) Assignee: Oil Spill Solutions, LLC, Center, TX (US)

( * ) Notice: Subject to any disclaimer, the term of this patent is extended or adjusted under 35 U.S.C. 154(b) by 0 days.

(21) Appl. No.: 14/469,070

(22) Filed: Aug. 26, 2014

(51) Int. Cl.
| | |
|---|---|
| *B08B 7/00* | (2006.01) |
| *C08K 3/34* | (2006.01) |
| *C08K 5/01* | (2006.01) |
| *E02B 15/00* | (2006.01) |
| *C02F 1/28* | (2006.01) |
| *C02F 101/32* | (2006.01) |

(52) U.S. Cl.
CPC . *E02B 15/00* (2013.01); *B08B 7/00* (2013.01); *C02F 1/281* (2013.01); *C02F 1/285* (2013.01); *C02F 1/288* (2013.01); *C02F 2101/32* (2013.01); *Y10S 210/922* (2013.01); *Y10S 210/923* (2013.01); *Y10S 210/924* (2013.01)
USPC ............. 134/6; 134/38; 134/40; 524/445; 524/474; 210/922; 210/923; 210/924

(58) Field of Classification Search
USPC .......... 134/2, 38, 40, 42; 524/445, 59, 62, 70, 524/474; 210/922, 923, 925
See application file for complete search history.

(56) References Cited

U.S. PATENT DOCUMENTS

| | | | |
|---|---|---|---|
| 3,265,616 A | 8/1966 | Wyllie et al. | |
| 3,518,183 A | 6/1970 | Evans et al. | |
| 3,567,660 A | 3/1971 | Winkler | |
| 3,668,118 A | 6/1972 | Rhodes | |
| 3,739,913 A | 6/1973 | Bogosian | |
| 4,111,813 A | 9/1978 | Preus | |
| 4,172,031 A | 10/1979 | Hall et al. | |
| 4,182,677 A | 1/1980 | Bocard et al. | |
| 4,187,187 A | 2/1980 | Turbeville | |
| 4,728,343 A | 3/1988 | Snyder | |
| 4,764,282 A | 8/1988 | Snyder | |
| 5,180,704 A | 1/1993 | Reindl et al. | |
| 5,439,590 A | 8/1995 | Steffan | |
| 5,516,809 A | 5/1996 | Oliveira Da Cunha Lima | |
| 5,536,898 A | 7/1996 | Conner et al. | |
| 6,287,468 B1 | 9/2001 | Kim | |
| 6,653,389 B2 * | 11/2003 | Burris et al. | 524/445 |
| 6,969,469 B1 | 11/2005 | Xie | |
| 7,531,579 B2 | 5/2009 | Goldshtein et al. | |
| 7,850,855 B2 * | 12/2010 | Pomerleau et al. | 210/690 |
| 8,006,758 B2 | 8/2011 | Reynolds et al. | |
| 8,329,810 B2 | 12/2012 | Rikhoff et al. | |
| 2004/0059028 A1 * | 3/2004 | Burris et al. | 524/62 |
| 2005/0151289 A1 | 7/2005 | Rink et al. | |
| 2005/0252861 A1 | 11/2005 | Lin | |
| 2009/0266541 A1 | 10/2009 | Reynolds et al. | |
| 2014/0048488 A1 | 2/2014 | Mason | |

* cited by examiner

*Primary Examiner* — Saeed T Chaudhry
(74) *Attorney, Agent, or Firm* — John Wilson Jones; Jones & Smith, LLP

(57) ABSTRACT

Unprocessed, processed or refined hydrocarbon liquids as well as processed vegetable derived oil contaminants may be sequestered from a contaminated surface by applying onto the surface a blend comprising crumb rubber and hydrated magnesium silicate. The contaminated surface may be a solid surface (such as one composed of concrete, cement or asphalt) as well as an aqueous surface.

24 Claims, No Drawings

METHOD OF SEQUESTERING HYDROCARBONS OR VEGETABLE DERIVED OIL CONTAMINANTS FROM A SURFACE

FIELD OF THE DISCLOSURE

The disclosure relates to a method of sequestering hydrocarbons or vegetable derived oil contaminants from a liquid or solid surface as well as to a method of removing such contaminants from the liquid or solid surface.

BACKGROUND OF THE DISCLOSURE

Oil spills (or oil discharges) are not uncommon in aqueous bodies such as harbors, waterways, navigation channels as well as the open sea. Such spills typically form a surface layer which may extend over a wide area. In the past, catastrophic effects have been seen from the accidental discharge of oil from tankers, pipes, storage tanks as well as during exploration, drilling and production of oil. In addition to being leaked into aqueous bodies, oil spills are a common occurrence on land surfaces such as cement, concrete and asphalt as well as platforms used during production of oil and gas.

Oil spills are typically difficult to treat and a number of treatment agents have been reported in the literature. For instance, discharged oil has been treated with absorbents such as hay, straw, ground bark, sawdust, peat, wood chips, activated carbon, wool, cotton balls, corn husks, duck feathers, bagasse, treated perlite and polymeric materials such as shredded urethane foam, polyolefin foam, polypropylene, polyester, vinyl polymers, etc.

Synthetic rubbers have also been used as an absorbent. Note, for example, U.S. Pat. No. 3,265,616 which discloses the use of a synthetic rubber latex. See also U.S. Pat. No. 4,182,677 which discloses the use of rubber waste or rubber crumb (including that obtained from used tires) to absorb spilled oil. The crumb rubber may be in the form of a powder whose grains have a size ranging from 0.1 to 1 mm. Other methods have been reported wherein a rubber film is formed by coagulating absorbed oil within a rubber latex. Such absorbents may be placed inside booms or other barriers that surround the spill. Alternatively, such absorbents may be contained within containers including porous woven fabric containers.

Surface active agents have also been used for the removal of oil from contaminated aqueous surfaces wherein the surface active agent emulsifies the discharged oil. The emulsion fosters the precipitation of oil as it sinks to the bottom of the aqueous body.

Other methods have been reported wherein a chemical agent is used to congeal oil to produce a stiffened mass or gel. The congealed oil is then placed onto a net or screen which holds the congealed oil while allowing water to drain through the net or screen.

Attaining an even distribution of treatment agents onto contaminated surfaces has proven to be difficult. This has been seen in the application of such absorbents in waterways as well as on ground surfaces. Further, while many of the absorbents previously reported have been successful in attracting spilled oil, the collection of the composite of absorbent and oil is often difficult as the composite has been unable to remain on the surface of the aqueous body.

A need exists for a treatment agent which, when oil is sorbed thereto, exhibits enhanced stability. In addition, a need exists for a sorbent which, when combined with the spilled oil, forms a composite which will not sink into the waterway.

There is further a need for a sorbent which may be more evenly applied over the area defined by the oil spill than offered by the systems of the prior art.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment, the disclosure relates to a method of sequestering unprocessed, processed or refined hydrocarbon liquids as well as processed vegetable derived oil contaminants from a contaminated surface. In this method, a blend comprising crumb rubber and hydrated magnesium silicate is applied onto the contaminated surface. The lubricity of the crumb rubber is enhanced by the presence of the hydrated magnesium silicate. The enhanced lubricity aids in the distribution/application of the blend in both water and/or land surface contaminant surfaces. The amount of hydrated magnesium silicate in the blend is an amount sufficient to enhance the lubricity of the crumb rubber.

In another embodiment of the disclosure, a method of stabilizing a surface contaminated with one or more hydrocarbons is provided. In this method, a blend comprising crumb rubber and hydrated magnesium silicate is applied onto the surface. The surface may be liquid or solid.

In another embodiment of the disclosure, a method for recovering oil floating on water is provided. In this method a blend comprising crumb rubber and hydrated magnesium silicate is applied onto the floating oil. A colloidal mass is formed by sorbing oil within or onto one or more components of the blend. The specific gravity of the colloidal mass is less than the specific gravity of the oil prior to the formation of the colloidal mass. The blend with the sorbed oil is then recovered from the water.

In another embodiment of the disclosure, a method for removing oil from an aqueous body contaminated with oil is provided. In this embodiment, a solid blend comprising crumb rubber and hydrated magnesium silicate is applied onto the oil contaminated aqueous body. Oil is then sorbed from the oil contaminated aqueous body by the dry blend from the oil contaminated aqueous body onto the solid blend. The solid blend is the removed with the absorbed and/or adsorbed oil from the aqueous body.

Accordingly, the present disclosure includes features and advantages which are believed to enable it to advance the removal of oil from contaminated surfaces. Characteristics and advantages of the present disclosure described above and additional features and benefits will be readily apparent to those skilled in the art upon consideration of the following detailed description of various embodiments.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The methods that may be described above or claimed herein and any other methods which may fall within the scope of the appended claims can be performed in any desired suitable order and are not necessarily limited to any sequence described herein or as may be listed in the appended claims.

The blend for treating the contaminated surface disclosed herein comprises crumb rubber and hydrated magnesium silicate. The blend is free from toxic components, is ecologically safe and is safe to handle.

In a preferred embodiment of the disclosure, a dry blend of the crumb rubber and hydrated magnesium silicate may be used to recover oil discharged onto or within an aqueous surface. In this embodiment, the hydrocarbon liquid or vegetable derived oil floats on the surface of the aqueous body. A colloidal mass is formed by sorption of the oil with the blend. It is likely that the oil is both absorbed into and adsorbed onto the surface of the crumb rubber and/or hydrated magnesium silicate. (As used herein, the term "sorb" or "sorbing" is used to encompass both absorption and/or adsorption.)

The lubricity of the crumb rubber is enhanced by the presence of the hydrated magnesium silicate in the blend. The amount of hydrated magnesium silicate in the blend is typically sufficient to enhance the lubricity of the crumb rubber. Typically, the amount of hydrated magnesium silicate in the blend is between from about 0.5 to about 10 weight percent.

The hydrophobicity of the hydrated magnesium silicate further enhances the sorptivity power of the crumb rubber to the hydrocarbon liquid and/or processed vegetable derived oil such that the sorption of the hydrocarbon liquid and/or processed vegetable derived oil with the crumb rubber is improved. As such, the sorption power of the blend with respect to hydrocarbon liquids and vegetable derived oil is higher than that of particles of crumb rubber. Thus, the amount of hydrated magnesium silicate in the blend should be sufficient to enable sorption of hydrocarbon and oil contaminants to form a colloidal mass. The sequestration of the discharged oil or vegetable derived oil by the blend disclosed herein stabilizes the contaminated surface such that the colloidal mass formed from the contaminant and the blend is more stable than the (same) contaminated surface only treated with crumb rubber. In fact, the contaminated surface treated with the blend is more stable than the same contaminated surface treated with an equivalent amount of crumb rubber by itself.

The adhesive interaction in the hydrated magnesium silicate is believed to be strong enough to overcome unfavorable entropy. Water thus adsorbs strongly on the surface of the hydrated magnesium silicate, thereby altering the specific gravity of the colloidal mass to be less than the specific gravity of water. This allows for greater stability of the colloidal mass in an open media environment and further facilitates greater efficiency and completeness of cleanup.

In the process, the hydrated magnesium silicate takes on the additional weight of the water in conjunction with the crumb rubber and the absorbed/adsorbed hydrocarbon and/or vegetable derived oil. The resulting mass obtains a more stable condition by providing condensation nuclei to form a more homogeneous mass. This allows the colloidal mass to be more homogeneous allowing it to be more easily contained and recovered and without sinking.

Thus, the presence of the hydrated magnesium silicate in the blend enables the specific gravity of the resultant colloidal mass to be altered. The presence of the hydrated magnesium silicate alters the specific gravity of the blend once the blend contacts water and begins to bond with the targeted hydrocarbon and/or vegetable derived oil. Upon absorption of the hydrocarbon contaminant and depending upon the percentage of type and content ratio of the blended material, the specific gravity of the resultant mass will enable the colloidal mass to exhibit a greater level of stability in an open media environment when applied directly onto the contaminated surface. This facilitates in turn, higher efficiency and completeness of cleanup. Thus, the weight percentage of the hydrated magnesium silicate in the blend may be adjusted such that the specific gravity of the oil in the colloidal mass is less than the specific gravity of the oil prior to the formation of the colloidal mass. As such, the components of the blend will not sink into water nor will they dissolve too quickly in the oil. In addition, the sorbent particles are not taken off by wind due to surface tension. Greater amounts of hydrocarbon may thus be recovered.

The crumb rubber is typically natural rubber, synthetic rubber or a mixture thereof. The crumb rubber may be composed of any number of elastomers known in the art. Suitable elastomers include those derived from one or more monomers and include block copolymers. Such monomers include conjugated dienes, such as those having 4 to 12 carbon atoms. These may include butadiene, styrene, isoprene, isobutylene, etc. In addition, the crumb rubber may be a nitrile rubber, an acrylic rubber, an ethylene-propylene copolymer, polymers or copolymers of chlorinated or cyano-olefins. Further, the crumb rubber may be a natural rubber or a blend containing natural rubber. In a preferred embodiment, the crumb rubber contains butadiene.

Typically, at least a portion of the crumb rubber originates from a waste product. For example, the crumb rubber may be recovered from rubber articles, such as used or recycled tires. In a preferred embodiment, the tires have been recycled wherein wire as well as the cord has been removed from the used rubber. Typically, the recycled rubber contains less than 2 weight percent of synthetic fibers. The waste product may be shredded into small pieces by crushing or grinding. The particle size of the resulting crumb rubber is between from about 10 to about 100 mesh, more typically between from about 10 to about 30 mesh.

The particle size of the hydrated magnesium silicate is between from about 80 to about 200 mesh and may be the same size as the crumb rubber. Typically, the size of the hydrated magnesium silicate is typically between from about 2 to 20 times the size of the rubber crumb, more typically from about 8 to 15 times.

The blend is preferably prepared in a low speed ribbon blender with aeration in order to prevent the buildup of heat.

The contaminants are typically hydrocarbon based and may be unprocessed hydrocarbons (such as crude oil), processed hydrocarbons (such as oil from a refinery) or refined hydrocarbons (such as liquefied petroleum gas, propylene, gasoline, jet fuel or diesel).

In another embodiment, the contaminant may be a processed vegetable derived oil including biofuels compatible with petroleum derived fuels. Exemplary of such biofuels are diesel fuel (compatible with petroleum derived diesel fuel). The term vegetable derived oil as used herein shall include biofuels as well as blends of petroleum derived fuels and biofuels. Suitable vegetable oils as bio-feedstocks for the production of biofuels include rapeseed oil, soy oil, palm oil, jatropha oil, etc.

The blend may be used to treat contaminated surfaces which are aqueous or which are solid. Exemplary solid surfaces include those composed of cement, concrete, asphalt, natural and synthetic rock, temporary flooring such as that used during construction, well treatment operations, entertainment events, sporting events, etc. In a particularly preferred embodiment, the blend is used to remove oil from aqueous surfaces including salt water and fresh water such as harbors, waterways, navigation channels, lakes, oceans, shores, bays, lakes, around oil tank farms and where hydrocarbon fuels are dispensed, etc. The contaminants may originate from tankers, pipes, storage tank as well as during the drilling and exploration of oil.

The blend may further contain a granulated anionic surfactant for accelerating the sorption of the hydrocarbon liquid and/or vegetable derived oil onto the crumb rubber. The particle size of the granulated anionic surfactant may be between from about 80 to about 20 mesh and typically is the same size as the hydrated magnesium silicate and more typically about 50 to about 75% of the particle size of the hydrated magnesium silicate.

Exemplary granulated anionic surfactants include sulfates, sarcosinates, sulfonates, phosphates, taurates, lactylates, glutamates, soaps and mixtures thereof. Preferred anionic surfactants include anionic salts having alkyl substituents of 8 to 22 carbon atoms such as the water-soluble higher fatty acid alkali metal soaps, e.g., sodium myristate and sodium palmitate; alkali metal and ammonium salts of sulfated fatty alcohols containing from about 10 to 18 carbon atoms (e.g., sodium lauryl sulfate, sodium stearyl sulfate, ammonium lauryl sulfate, ammonium laureth sulfate, sodium laureth sulfate, sodium trideceth sulfate, ammonium cetyl sulfate and sodium cetyl sulfate); water-soluble sulfated and sulfonated anionic alkali metal and alkaline earth metal detergent salts containing a hydrophobic alkyl containing from about 8 to 22 carbon atoms (such as salts of higher alkyl mono or polynuclear aryl sulfonates having from about 1 to 16 carbon atoms in the alkyl group like sodium dodecylbenzenesulfonate, magnesium tridecylbenzenesulfonate, lithium or potassium pentapropylenebenzenesulfonate); alkali metal salts of alkyl naphthalene sulfonic acids (such as methyl naphthalene sodium sulfonate); sulfated higher fatty acid monoglycerides such as the sodium salt of the sulfated monoglyceride of coconut oil fatty acids and the potassium salt of the sulfated monoglyceride of tallow fatty acids; alkali metal salts of sulfated ethylenoxy-derivatized fatty alcohols; alkali metal salts of higher fatty esters of low molecular weight alkylol sulfonic acids, e.g., fatty acid esters of the sodium or ammonium salt of isethionic acid like sodium lauroyl isethionate; fatty ethanolamide sulfates; fatty acid amides of amino alkyl sulfonic acids, e.g., lauric acid amide of taurine; sodium xylene sulfonate, sodium naphthalene sulfonate, sodium toluene sulfonate; and mixtures thereof. In addition, exemplary surfactants are sodium lauroyl lactylate, triethanolamine lauroyl lactylate, sodium caproyl lactylate, sodium lauroyl sarcosinate, sodium myristoyl sarcosinate, sodium cocoyl sarcosinate, sodium lauroyl methyl taurate, sodium cocoyl methyl taurate, sodium lauroyl glutamate, sodium myristoyl glutamate, and sodium cocoyl glutamate and mixtures thereof. Sodium lauryl sulfate is especially preferred.

The blend may further optionally contain other additives such as pigments, tracers, resins, ultraviolet stabilizers, extender oils, antioxidants, dry polymers such as polyolefins (optionally crosslinked), polycarbonates, olefinic block copolymers, cellulosic and lignocellulosic materials, etc.

In an embodiment, the blend may be applied directly onto the contaminated surface. The blended material may be easily dispersed (without the use of a solvent) over the contaminated area by free form such as aerial dispersion, blown distribution or manually without regard to separation of the crumb rubber and the hydrated magnesium silicate. This allows more of the blend to be exposed to the contaminated surface. In addition, open application of the blend to the surface makes easier recovery of the sequestered material since it retains a position on or near the surface. Further the blend is easily stored and transported.

In another embodiment, especially where the surface treated is an aqueous surface, the blend may be applied onto the contaminated surface within a containment system. Suitable containment systems may include booms, nets, mops, sleeves, bags, woven fabrics, tubes, sacks (optionally containing tubers), etc. When the contaminated surface is a solid surface, the colloidal mass may be removed by sweeping or shoveling or other acceptable collections means.

The blend containing the absorbed oil and/or adsorbed oil may be recovered from the water by conventional means, such as by vacuuming or use of a net, wire gauze, skimmer, etc. A colloidal mass containing the blend and the recovered oil typically contain about 10-15% of the initial blend; the rest being the recovered hydrocarbon liquid and/or vegetable derived oil.

The blend may be easily recycled, i.e., its sorption properties can be regenerated by squeezing out the sorbed by compression, centrifuge, etc.

In another embodiment, the blend may be used to clean solid surfaces, such as concrete or asphalt, where fuel and/or engine oil spills have occurred. The blend sorbs such contaminants quickly and can be easily brushed away. Collected oil products can then be squeezed off with a press, after which the sorbent may be reused.

In another embodiment, the blend may be used to remove cuttings from a drilling fluid after the drilling fluid has been returned to the surface. In this manner a blend containing the crumb rubber and hydrated magnesium silicate may be introduced to the returned drilling fluid. Cuttings within the drilling fluid may then be absorbed and/or adsorbed by the crumb rubber. The cuttings may contain hydrocarbons, salts, metals, soaps and other agents added to the drilling fluid to assist in the drilling and become mixed with the frilling fluid from the formation. Typically, the amount of hydrocarbons in the cuttings may be 15% by weight or higher.

The presence of the hydrated magnesium silicate in the blend enhances the lubricity of the crumb rubber. The amount of cuttings absorbed and/or adsorbed by the crumb rubber is thereby increased. Thus, the amount of cuttings absorbed and/or adsorbed by the blend containing the crumb rubber and the hydrated magnesium silicate is higher for a given volume of drilling fluid than the amount of cuttings absorbed and/or adsorbed by just the crumb rubber itself (wherein the amount of the blend and the crumb by itself or of equal amounts).

The cuttings may be removed from the blend and the cuttings disposed in an environmentally friendly manner such as by land farming, landfill disposal, thermal desorption, enhanced bio-degradation, etc. While removal of the cuttings from the blend is not required, removal of the cuttings from the blend reduces the volume of waste which must be transported to and contained at a disposal site.

What is claimed is:

1. A method of sequestering unprocessed, processed or refined hydrocarbon liquids or processed vegetable derived oil contaminants from a contaminated surface comprising applying onto the contaminated surface a blend comprising crumb rubber and hydrated magnesium silicate, wherein the lubricity of the crumb rubber is enhanced by the presence of the hydrated magnesium silicate and further wherein the amount of hydrated magnesium silicate in the blend is an amount sufficient to enhance the lubricity of the crumb rubber.

2. The method of claim 1, wherein the unprocessed, processed or refined hydrocarbon liquid is oil, liquefied petroleum gas, propylene, gasoline, jet fuel or diesel.

3. The method of claim 2, wherein the unprocessed, processed or refined hydrocarbon liquid is oil.

4. The method of claim 1, wherein the contaminated surface is an aqueous surface.

5. The method of claim 4, wherein the unprocessed, processed or refined hydrocarbon liquid is oil.

6. The method of claim 1, wherein the surface is a solid surface.

7. The method of claim 6, wherein the unprocessed, processed or refined hydrocarbon liquid is oil.

8. The method of claim 6, wherein the solid surface comprise drill cuttings.

9. The method of claim 6, wherein the surface is cement, asphalt or concrete.

10. The method of claim 1, wherein the particle size of the rubber crumb is between from about 10 to about 100 mesh.

11. The method of claim 10, wherein the particle size of the rubber crumb is between from about 10 to about 30 mesh.

12. The method of claim 1, wherein the particle size of the hydrated magnesium silicate is between from about 80 to about 200 mesh.

13. The method of claim 1, wherein the blend further comprises a granulated anionic surfactant.

14. The method of claim 13, wherein the granulated anionic surfactant is a sulfate, sarcosinate, sulfonate, phosphate, taurate, lactylate, glutamate, soap or a mixture thereof.

15. The method of claim 14, wherein the granulated anionic surfactant is sodium lauryl sulfate.

16. The method of claim 1, wherein the blend applied onto the contaminated surface is within a containment system.

17. The method of claim 1, wherein the crumb rubber is ground recycled tires.

18. The method of claim 1, wherein the crumb rubber is a polymer of a conjugated diene, styrene, isobutylene, a nitrile, an acrylic, ethylene and propylene, a chlorinated olefin or a cyano-olefin or is natural rubber or a mixture thereof.

19. The method of claim 15, wherein the synthetic rubber is polybutadiene.

20. The method of claim 1, wherein the amount of hydrated magnesium silicate in the blend is between from about 1 to about 10 weight percent.

21. A method of stabilizing a surface contaminated with one or more hydrocarbons comprising applying onto the surface a blend comprising crumb rubber and hydrated magnesium silicate.

22. The method of claim 21, wherein the stability of the contaminated surface treated with the blend is greater than a substantially similar contaminated surface treated only with the crumb rubber.

23. A method for recovering oil floating on water comprising:
   (a) applying onto the floating oil a blend comprising crumb rubber and hydrated magnesium silicate; and
   (b) forming a colloidal mass by sorbing oil within or onto one or more components of the blend, wherein the specific gravity of the oil in the colloidal mass is less than the specific gravity of the oil prior to the formation of the colloidal mass; and
   (c) recovering the blend with the sorbed oil from the water.

24. A method for removing oil from aqueous body contaminated with oil which comprises:
   (a) applying a solid dry blend comprising crumb rubber and hydrated magnesium silicate onto the oil contaminated aqueous body; and
   (b) sorbing oil from the oil contaminated aqueous body within or onto one or more components of the solid dry blend; and
   (c) removing the solid blend with the sorbed oil from the aqueous body.

* * * * *